US009488872B2

(12) United States Patent
Wang

(10) Patent No.: US 9,488,872 B2
(45) Date of Patent: Nov. 8, 2016

(54) CELL-ASSEMBLED MOTHERBOARD AND FABRICATION METHOD THEREOF, AND LIQUID CRYSTAL DISPLAY PANEL AND FABRICATION METHOD THEREOF

(71) Applicants: BOE TECHNOLOGY GROUP CO., LTD., Beijing (CN); BEIJING BOE DISPLAY TECHNOLOGY CO., LTD., Beijing (CN)

(72) Inventor: Mingchao Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 54 days.

(21) Appl. No.: 14/429,972

(22) PCT Filed: Jul. 3, 2014

(86) PCT No.: PCT/CN2014/081570
§ 371 (c)(1),
(2) Date: Mar. 20, 2015

(87) PCT Pub. No.: WO2015/109768
PCT Pub. Date: Jul. 30, 2015

(65) Prior Publication Data
US 2016/0026017 A1 Jan. 28, 2016

(30) Foreign Application Priority Data
Jan. 24, 2014 (CN) .......................... 2014 1 0035677

(51) Int. Cl.
*G02F 1/1339* (2006.01)
*G02F 1/1333* (2006.01)

(52) U.S. Cl.
CPC ......... *G02F 1/1339* (2013.01); *G02F 1/13394* (2013.01); *G02F 1/133351* (2013.01); *G02F 1/133377* (2013.01); *G02F 2001/13398* (2013.01)

(58) Field of Classification Search
CPC .. G02F 1/1339; G02F 1/1341; G02F 1/1345; G02F 1/133351; G02F 1/133394; G02F 1/133392; G02F 1/133512; G02F 2001/13415
USPC ........................................ 349/153, 155, 190
See application file for complete search history.

(56) References Cited

U.S. PATENT DOCUMENTS

2014/0125927 A1* 5/2014 Yoneyama ........ G02F 1/133512
349/104

2016/0070127 A1* 3/2016 Ishikawa ............... G02F 1/1339
349/42

FOREIGN PATENT DOCUMENTS

CN 201133992 Y 10/2008
CN 101441349 A 5/2009
(Continued)

OTHER PUBLICATIONS

International Search Report Appln. No. PCT/CN2014/081570; Dated Nov. 3, 2014.
(Continued)

*Primary Examiner* — Mike Qi
(74) *Attorney, Agent, or Firm* — Ladas & Parry LLP

(57) ABSTRACT

A cell-assembled motherboard and a fabrication method thereof, and a liquid crystal display panel and a fabrication method thereof are disclosed. The cell-assembled motherboard comprises a first motherboard (1) and a second motherboard (1) which are arranged opposite to each other, wherein a plurality of liquid crystal cells (4) arranged in a matrix and having display regions (3) are arranged between the first motherboard (1) and the second motherboard (2), a first sealant (5) having a closed profile and surrounding the display region (3) of each of the liquid crystal cells (4) is arranged between the first motherboard (1) and the second motherboard (2), and a second sealant (6) having a closed profile and surrounding a region where the liquid crystal cells (4) arranged in a matrix exist is arranged between the first motherboard (1) and the second motherboard (2). A first elastic component (7) having elasticity is arranged in a position where the first motherboard (1) is in contact with the first sealant (5) and/or a position where the first motherboard (1) is in contact with the second sealant (6); and/or a second elastic component (8) having elasticity is arranged in a position where the second motherboard (2) is in contact with the first sealant (5) and/or a position where the second motherboard (2) is in contact with the second sealant (5). When the cell-assembled motherboard is cut, the elasticity of the added elastic components avoids the problem of non-uniform thicknesses of liquid crystal cells, which problem is caused due to the situation a sealant poor in elasticity cannot recover from deformation, thus preventing the problem of non-uniform display brightness of the liquid crystal cells (4) and improving the display quality; moreover, the addition of the elastic components in corresponding regions of the sealants also decreases the amount of the sealants used and consequentially reduces the production cost.

19 Claims, 3 Drawing Sheets

(56) References Cited

FOREIGN PATENT DOCUMENTS

| CN | 103792736 | A | 5/2014 |
|----|-----------|---|--------|
| JP | 2007-187866 | A | 7/2007 |
| JP | 2008-233721 | A | 10/2008 |
| JP | 4320339 | B2 | 8/2009 |
| JP | 2012-141606 | A | 7/2012 |
| KR | 101296647 | B1 | 8/2013 |

OTHER PUBLICATIONS

Written Opinion of the International Searching Authority Appln. No. PCT/CN2014/081570; Dated Nov. 3, 2014.
First Chinese Office Action Appln. No. 201410035677.9; Dated Oct. 29, 2015.
Second Chinese Office Action dated May 12, 2016; Appln. No. 201410035677.9.

* cited by examiner

US 9,488,872 B2

CELL-ASSEMBLED MOTHERBOARD AND FABRICATION METHOD THEREOF, AND LIQUID CRYSTAL DISPLAY PANEL AND FABRICATION METHOD THEREOF

TECHNICAL FIELD

Embodiments of the invention relate to a cell-assembled motherboard and a fabrication method thereof, and a liquid crystal display panel and a fabrication method thereof.

BACKGROUND

A liquid crystal cell mainly comprises an opposite substrate, an array substrate and liquid crystal molecules between the two substrates. In the actual process of fabricating a liquid crystal cell, first of all, a plurality of opposite substrate regions and a plurality of array substrate regions, which are both arranged in a matrix, are separately formed on two motherboards, and then, a sealant is applied between the two motherboards and the two motherboards are cell-assembled, and finally, the two motherboards are separately cut along each of the opposite substrate regions and each of the array substrate regions into a plurality of small liquid crystal cells.

As shown in FIG. 1a and FIG. 1b, a cell-assembled motherboard comprises a first motherboard 101 and a second motherboard 102, which are arranged opposite to each other and between which a plurality of liquid crystal cells 103 arranged in a matrix are formed, and each of the liquid crystal cells 103 has a display region 104 and a non-display region. A first sealant 105 is coated in the non-display region of each liquid crystal cell 103 between the first motherboard 101 and the second motherboard 102 so as to support the first motherboard 101 and the second motherboard 102 and effectively seal the liquid crystal molecules filled between the two motherboards. A second sealant 106 is coated along an edge region outside the liquid crystal cells 103 arranged in a matrix between the first motherboard 101 and the second motherboard 102, the second sealant 106 merely functions to support the first motherboard 101 and the second motherboard 102 during a cutting process subsequent to the cell-assembling process, and the motherboard region where the second sealant 106 exists is cut off after the cell-assembled motherboard is divided into a plurality of liquid crystal cells.

When the cell-assembled motherboard is cut, the two motherboards are squeezed, which is likely to deform the sealants; and because of poorness in elasticity, the sealants can hardly recover from deformation, resulting in that the finally formed liquid crystal cells are not uniform in thickness, and as a consequence, a problem of non-uniform display brightness is caused, which degrades the display quality.

Thus, how to effectively avoid the problem of non-uniform cell thicknesses of liquid crystal cells caused when a cell-assembled motherboard is cut becomes a problem to be urgently solved by those of ordinary skill in the art.

SUMMARY

According to an embodiment of the present invention, a cell-assembled motherboard is provided, comprising: a first motherboard and a second motherboard which are arranged opposite to each other, wherein a plurality of liquid crystal cells arranged in a matrix and having display regions are arranged between the first motherboard and the second motherboard, a first sealant having a closed profile and surrounding the display region of each of the liquid crystal cells is arranged between the first motherboard and the second motherboard, and a second sealant having a closed profile and surrounding a region where the liquid crystal cells arranged in a matrix exist is arranged between the first motherboard and the second motherboard. A first elastic component having elasticity is arranged in a position where the first motherboard is in contact with the first sealant and/or a position where the first motherboard is in contact with the second sealant; and/or a second elastic component having elasticity is arranged in a position where the second motherboard is in contact with the first sealant and/or a position where the second motherboard is in contact with the second sealant.

For example, a material of the first elastic component is same as that of a spacer located in the liquid crystal cell; and/or a material of the second elastic component is same as that of the spacer located in the liquid crystal cell.

For example, the spacer in each liquid crystal cell is arranged on a side of the first motherboard facing the second motherboard; and the first elastic component is arranged on a same layer as the spacer.

For example, in each liquid crystal cell, a common electrode and a pixel electrode are located on the first motherboard and the second motherboard, respectively; at least one third sealant in a region outside the display region of the liquid crystal cell is arranged between the first motherboard and the second motherboard, and the first motherboard is electrically connected with the second motherboard via the third sealant.

For example, a ratio of a first thickness of the first sealant, along a direction vertical to the first motherboard and the second motherboard, to a thickness of the liquid crystal cell, along a direction vertical to the first motherboard and the second motherboard, is from 1:1.2 to 1:2; and a ratio of a second thickness of the second sealant, along a direction vertical to the first motherboard and the second motherboard, to the thickness of the liquid crystal cell, along a direction vertical to the first motherboard and the second motherboard, is from 1:1.2 to 1:2.

For example, the ratio of the first thickness to the thickness of the liquid crystal cell is 1:1.5, and the ratio of the second thickness to the thickness of the liquid crystal cell is 1:1.5.

For example, a contact surface of the first elastic component, arranged at the position where the first motherboard is in contact with the first sealant, with the first sealant is a plane; a contact surface of the first elastic component, arranged at the position where the first motherboard is in contact with the second sealant, with the second sealant is a plane; a contact surface of the second elastic component, arranged at the position where the second motherboard is in contact with the first sealant, with the first sealant is a plane; and a contact surface of the second elastic component, arranged at the position where the second motherboard is in contact with the second sealant, with the second sealant is a plane.

According to an embodiment of the present invention, a method for fabricating a cell-assembled motherboard is provided, comprising: forming, on a first motherboard, a pattern for a plurality of opposite substrates arranged in a matrix and having display regions, and correspondingly forming, on a second motherboard, a pattern for a plurality of array substrates arranged in a matrix and having display regions; forming, on the first motherboard or the second motherboard, a first sealant having a closed profile and surrounding each of the display regions; and forming, on the first motherboard, a second sealant having a closed profile and surrounding a region where the pattern of the opposite substrates arranged in a matrix exists, or forming, on the second motherboard, a second sealant having a closed profile and surrounding a region where the pattern of the array substrates arranged in a matrix exists; and cell-assembling the first motherboard and the second motherboard when forming, on the first motherboard, the pattern for a plurality of opposite substrates arranged in a matrix and having display regions, the method further comprises: forming, on the first motherboard, a pattern of a first elastic component corresponding to an application region of the first sealant and/or an application region of the second sealant; and/or when forming, on the second motherboard, the pattern for a plurality of array substrates arranged in a matrix and having display regions, the method further comprises: forming, on the second motherboard, a pattern of a second elastic component corresponding to an application region of the first sealant and/or an application region of the second sealant.

For example, forming, on the first motherboard, of a pattern of a first elastic component corresponding to an application region of the first sealant and/or an application region of the second sealant comprises: forming the pattern of the first elastic component while forming a spacer pattern in the pattern of each of the opposite substrates by using one patterning process.

For example, forming of the pattern of the first elastic component while forming the spacer pattern in the pattern of each of the opposite substrates comprises: forming a spacer film on the first motherboard; exposing the spacer film by using a half-tone or gray-tone mask, wherein a completely transparent region of the mask is corresponding to a region of the spacer pattern to be formed; a partially transparent region of the mask is corresponding to a region of the pattern of the first elastic component to be formed; and developing the spacer film exposed to obtain the spacer pattern and the pattern of the first elastic component.

According to an embodiment of the present invention, a method for fabricating a liquid crystal display panel is provided, comprising: forming, on a first motherboard, a pattern for a plurality of opposite substrates arranged in a matrix and having display regions, and correspondingly forming, on a second motherboard, a pattern for a plurality of array substrates arranged in a matrix and having display regions; forming, on the first motherboard or the second motherboard, a first sealant having a closed profile and surrounding each of the display regions; forming, on the first motherboard, a second sealant having a closed profile and surrounding a region where the pattern of the opposite substrates arranged in a matrix exists, or forming, on the second motherboard, a second sealant having a closed profile and surrounding a region where the pattern of the array substrates arranged in a matrix exists; cell-assembling the first motherboard and the second motherboard; and cutting the first motherboard and the second motherboard which are cell-assembled into a liquid crystal display panel. When forming, on the first motherboard, the pattern for a plurality of opposite substrates arranged in a matrix and having display regions, the method further comprises: forming, on the first motherboard, a pattern of a first elastic component corresponding to an application region of the first sealant and/or an application region of the second sealant; and/or when forming, on the second motherboard, the pattern for a plurality of array substrates arranged in a matrix and having display regions, the method further comprises: forming, on the second motherboard, a pattern of a second elastic component corresponding to an application region of the first sealant and/or an application region of the second sealant.

For example, forming, on the first motherboard, of a pattern of a first elastic component corresponding to an application region of the first sealant and/or an application region of the second sealant, comprises: forming the pattern of the first elastic component while forming a spacer pattern in the pattern of each of the opposite substrates by using one patterning process.

For example, forming of the pattern of the first elastic component while forming a spacer pattern in the pattern of each of the opposite substrates comprises: forming a spacer film on the first motherboard; exposing the spacer film by using a half-tone or gray-tone mask, wherein a completely transparent region of the mask is corresponding to a region of the spacer pattern to be formed; a partially transparent region of the mask is corresponding to a region of the pattern of the first elastic component to be formed; and developing the spacer film exposed to obtain the spacer pattern and the pattern of the first elastic component.

An embodiment of the invention further provides a liquid crystal display panel which is fabricated by using the method provided herein.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

The shape and the thickness of each film layer shown in the accompanying drawings are merely illustrative of embodiments of the present invention, but not intended to reflect real scales.

Figure 1A:
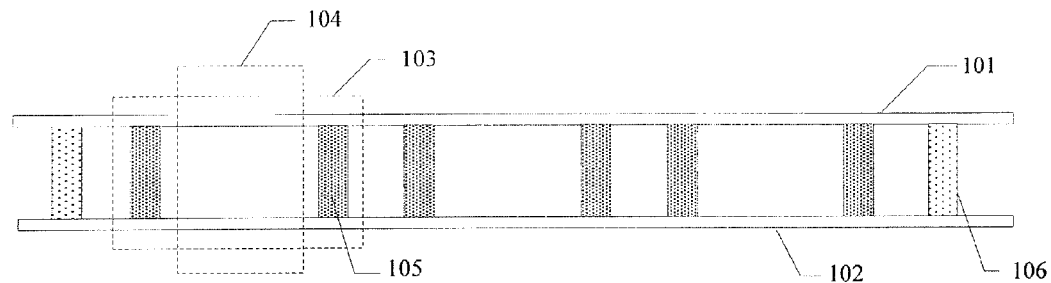
FIG. 1a and FIG. 1b are a side view and a top view of a cell-assembled motherboard according to the state of art.
Figure 1B:
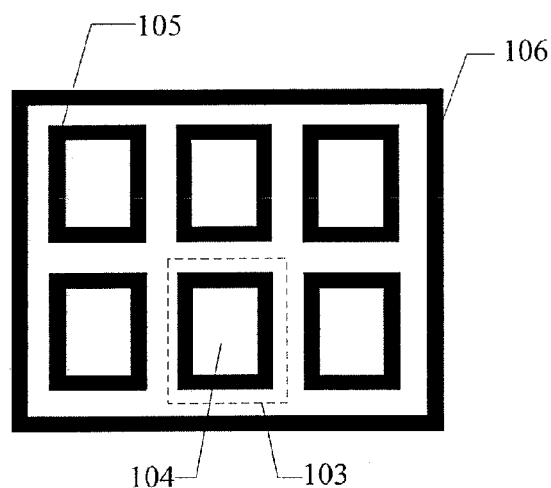
Figure 2A:
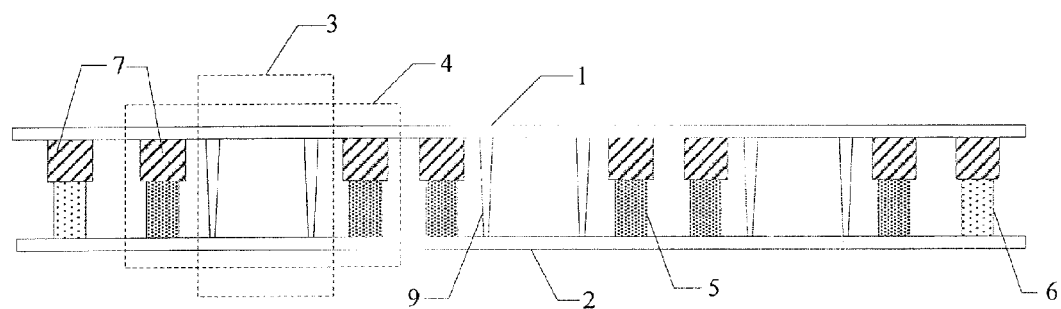
FIG. 2a and FIG. 2b are side views of a cell-assembled motherboard provided by an embodiment of the present invention.
Figure 2B:
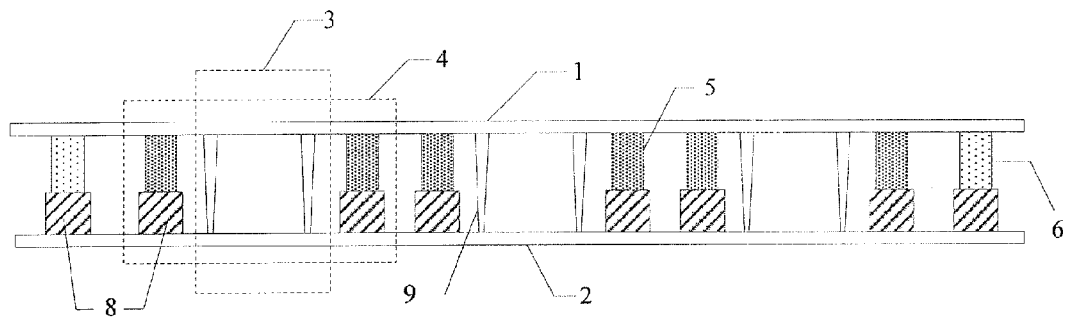

A cell-assembled motherboard provided by an embodiment of the present invention, as shown in FIG. 2a and FIG. 2b, comprises: a first motherboard 1 and a second motherboard 2 which are arranged opposite to each other; a plurality of liquid crystal cells 4 arranged in a matrix and having display regions 3 are arranged between the first motherboard 1 and the second motherboard 2; a first sealant 5 which has a closed profile and surrounds the display region 3 of each of the liquid crystal cells 4 is arranged between the first motherboard 1 and the second motherboard 2, and a second sealant 6 which has a closed profile and surrounds a region where the liquid crystal cells 4 arranged in a matrix exist is arranged between the first motherboard 1 and the second motherboard 2.

As shown in FIG. 2a, a first elastic component 7 having elasticity is arranged at a position where the first motherboard 1 is in contact with the first sealant 5 and/or a position where the first motherboard 1 is in contact with the second sealant 6; and/or as shown in FIG. 2b, a second elastic component 8 having elasticity is arranged at a position where the second motherboard 2 is in contact with the first sealant 5 and/or a position where the second motherboard 2 is in contact with the second sealant 6. As an example, FIG. 2a shows the arrangement of the first elastic components 7 at the position where the first motherboard 1 is in contact with the first sealant 5 and at the position where the first motherboard 1 is in contact with the second sealant 6. As an example, FIG. 2b shows the arrangement of the second elastic components 8 at the position where the second motherboard 2 is in contact with the first sealant 5 and at the position where the second motherboard 2 is in contact with the second sealant 6.

In the foregoing cell-assembled motherboard provided by the embodiment of the present invention, since the first elastic component 7 is added at the position where the first motherboard 1 is in contact with the first sealant 5 and/or the position where the first motherboard 1 is in contact with the second sealant 6, and/or, the second elastic component 8 is added at the position where the second motherboard 2 is in contact with the first sealant 5 and/or the position where the second motherboard 2 is in contact with the second sealant 6, the certain elasticity of the added elastic components avoids the problem of non-uniform thicknesses of liquid crystal cells, which problem is caused due to the situation that a sealant poor in elasticity cannot recover from deformation, thus preventing the problem of non-uniform display brightness of the liquid crystal cells and improving the display quality; moreover, the addition of the elastic components in corresponding regions of the sealants also decreases the amount of the sealant used and consequentially reduces the production cost.

For example, to guarantee the excellent elastic property of the added elastic components, in the foregoing motherboard provided by the embodiment of the present invention, as shown in FIG. 2a and FIG. 2b, a material of the first elastic component 7 may be elected to be the same as that of a spacer 9 located in the liquid crystal cell 4 and a material of the second elastic component 8 may be elected to be the same as that of the spacer 9 located in the liquid crystal cell 4 because the material of the spacer 9 having desirable elasticity and strength causes little pollution to environment, moreover, it is technically easy to manufacture the elastic components with the material of the spacer 9. Absolutely, the elastic components may be made from other materials having excellent elastic property, which is not limited herein.

In the implementation, the added elastic components may be arranged in various ways. For example, the first elastic component 7 may be arranged merely at the position where the first motherboard 1 is in contact with the first sealant 5 or merely at the position where the first motherboard 1 is in contact with the second sealant 6; or the second elastic component 8 may be arranged merely at the position where the second motherboard 2 is in contact with the first sealant 5 or merely at the position where the second motherboard 2 is in contact with the second sealant 6, or the foregoing cases may also be optionally combined, which will not be limited herein.

In the foregoing motherboard provided by the embodiment of the present invention, the first elastic component 7 is arranged at the position where the first motherboard 1 is in contact with the first sealant 5, meanwhile, the second elastic component 8 is also arranged at the position where the second motherboard 2 is in contact with the first sealant 5, in this case, the first sealant 5 may break because of its too small thickness, resulting in leakage of liquid crystal molecules and other problems. Although the breakage of the sealant can be avoided by reducing the thickness of the first elastic component 7 and the second elastic component 8, the first elastic component 7 and the second elastic component 8, if too thin, will be weakened in elastic property. Thus, in a case where the first elastic component 7 is arranged at the position where the first motherboard 1 is in contact with the first sealant 5 while the second elastic component 8 is arranged at the position where the second motherboard 2 is in contact with the first sealant 5 as well, it is necessary to properly set the thicknesses of the first elastic component 7, the first sealant 5 and the second elastic component 8 to avoid the above-mentioned problem.

For example, in the foregoing motherboard provided by the embodiment of the present invention, the elastic components can be formed on a side of the motherboard where the spacer 9 is arranged, because in an ordinary structure of a liquid crystal cell, the spacer 9 is generally arranged on the side of the opposite substrate, the film layers such as a color filter arranged on the side of the opposite substrate are generally made from high molecular materials, and the elastic components, which are typically made from the same material as the spacer 9, are also generally made from a high molecular material, then the formation of the elastic components and the spacer 9 on the same motherboard makes the elastic components adhered to the motherboard more firmly and prevented from disconnecting from the motherboard.

For example, in order to avoid an additional fabrication process, in the foregoing motherboard provided by the embodiment of the present invention, when the spacer 9 in each liquid crystal cell 4 is arranged on a side of the first motherboard 1 facing the second motherboard 2, the first elastic component 7 may be arranged on a same layer as the spacer 9, that is, the spacer 9 and the first elastic component 7 are synchronously formed by using same one patterning process without using a new mask, increasing a fabrication process, and reducing the production efficiency.

Certainly, the spacer 9 in each liquid crystal cell 4 may also be arranged on a side of the second motherboard 2 facing the first motherboard 1, in this case, the second elastic component 8 may be arranged on a same layer as the spacer 9, that is, the spacer 9 and the second elastic component 8 are synchronously formed by using same one patterning process without using a new mask, increasing a fabrication process or reducing the production efficiency.

For example, in order to guarantee the appropriate thicknesses of the first sealant 5 and the second sealant 6 to avoid the breakage of the sealants and in consideration of the fabrication processes of the first elastic component 7 and the second elastic component 8, in the foregoing motherboard provided by the embodiment of the present invention, the ratio of a first thickness of the first sealant 5, along the direction vertical to the first motherboard 1 and the second motherboard 2, to a thickness of the liquid crystal cell 4, along the direction vertical to the first motherboard 1 and the second motherboard 2, is from 1:1.2 to 1:2, and the ratio of a second thickness of the second sealant 6, along the direction vertical to the first motherboard 1 and the second motherboard 2, to the thickness of the liquid crystal cell 4, along the direction vertical to the first motherboard 1 and the second motherboard 2, is from 1:1.2 to 1:2.

Further, for example, in the foregoing motherboard provided by the embodiment of the present invention, the ratio of the first thickness of the first sealant 5, along the direction vertical to the first motherboard 1 and the second motherboard 2, to the thickness of the liquid crystal cell 4 is 1:1.5, and the ratio of the second thickness of the second sealant 6, along the direction vertical to the first motherboard 1 and the second motherboard 2, to the thickness of the liquid crystal cell 4 is 1:1.5.

For example, in order to achieve uniform contact between the elastic components and the sealants to avoid the breakage of the sealants, in the foregoing motherboard provided by the embodiment of the present invention, the contact surface of the first elastic component 7, arranged at the position where the first motherboard 1 is in contact with the first sealant 5, with the first sealant 5 may be set to be a plane; the contact surface of the first elastic component 7, arranged at the position where the first motherboard 1 is in contact with the second sealant 6, with the second sealant 6 is a plane; the contact surface of the second elastic component 8, arranged at the position where the second motherboard 2 is in contact with the first sealant 5, with the first sealant 5 is a plane; the contact surface of the second elastic component 8, arranged at the position where the second motherboard 2 is in contact with the second sealant 6, with the second sealant 6 is a plane.

Certainly, the above-mentioned contact surfaces may be patterned according to actual requirements to increase the contact area between the elastic components and the sealants.

The liquid crystal cell 4 formed after cutting the cell-assembled motherboard according to the embodiment of the invention can be applied to a liquid crystal display of Advanced Super Dimension Switch (ADS) mode or a liquid crystal display of In-Plane Switch (IPS) mode, that is, a pixel electrode and a common electrode of the liquid crystal cell 4 are both located on a side of the array substrate facing a liquid crystal layer; the liquid crystal cell 4 formed after cutting the cell-assembled motherboard provided herein may also be applied to a liquid crystal display of Twisted Nematic (TN) mode or a liquid crystal display of Vertical Alignment (VA) mode, that is, the pixel electrode of the liquid crystal cell 4 is located on the side of the array substrate facing a liquid crystal layer, and the common electrode of the liquid crystal cell 4 is located on the side of the opposite substrate facing the liquid crystal layer, which will not be limited here.

Figure 3:
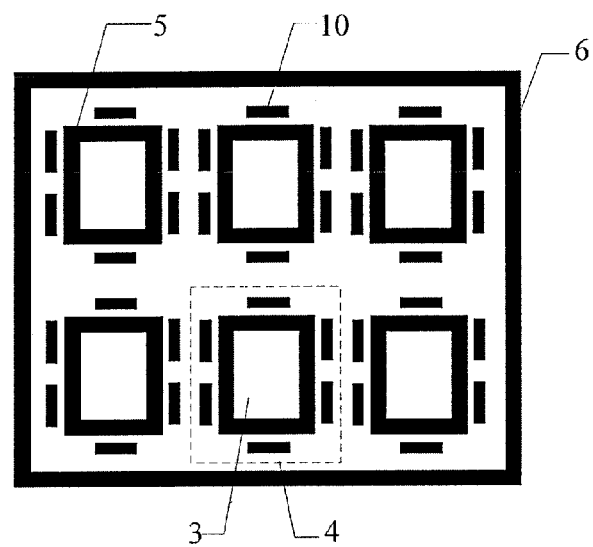
FIG. 3 is a top view of the cell-assembled motherboard provided by the embodiment of the present invention.

In a case where the liquid crystal cell 4 formed by cutting the cell-assembled motherboard provided by the embodiment of the invention is applied to the liquid crystal display of the TN mode or the liquid crystal display of the VA mode, in each liquid crystal cell 4, the common electrode and the pixel electrode are located on the first motherboard 1 and the second motherboard 2, respectively, that is, the common electrode is located on a side of the first motherboard 1 facing the second motherboard 2, and the pixel electrode is located on a side of the second motherboard 2 facing the first motherboard 1; or the pixel electrode is located on the side of the first motherboard 1 facing the second motherboard 2, and the common electrode is located on the side of the second motherboard 2 facing the first motherboard 1. For the liquid crystal display of such a type, it is necessary to electrically connect the first motherboard 1 with the second motherboard 2, as shown in FIG. 3, at least one third sealant 10 may be arranged in a region outside the display region 3 of the liquid crystal cell 4 between the first motherboard 1 and the second motherboard 2 so that the first motherboard 1 can be electrically connected with the second motherboard 2 through the third sealant 10.

Further, as the first elastic component 7 and the second elastic component 8 are both made from an insulating material, the arrangement of the third sealant 10 is especially applicable to a case where the first elastic component 7 is arranged at the position where the first motherboard 1 is in contact with the first sealant 5, and/or a case where the second elastic component 8 is arranged at the position where the second motherboard 2 is in contact with the second sealant 5.

Certainly, conductive beads may be added in the first elastic component 7 and the second elastic component 8 to accord the first elastic component 7 and the second elastic component 8 with a conductive property, thereby achieving an electrical connection of the first motherboard 1 and the second motherboard 2 without the third sealant 10, which will not be limited here.

In addition, in a case where the liquid crystal cell 4 formed after cutting the cell-assembled motherboard provided by the embodiment of the present invention is applied to the liquid crystal display of the ADS mode or the liquid crystal display of the IPS mode, as the common electrode and the pixel electrode are both located on the side of the first motherboard 1 facing the second motherboard or the side of the second motherboard 2 facing the first motherboard 1, for the liquid crystal display of such type, there is no need to electrically connect the first motherboard 1 with the second motherboard 2, and thus there is no need to arrange the third sealant 10 in the region outside the display region 3 of the liquid crystal cell 4 between the first motherboard 1 and the second motherboard 2.

With respect to the implementation of the foregoing cell-assembled motherboard provided by the embodiment of the invention, an embodiment of the invention further provides a method for fabricating a cell-assembled motherboard, which may comprise the following steps:

(1) Forming, on a first motherboard, a pattern for a plurality of opposite substrates arranged in a matrix and having display regions, and correspondingly forming, on a second motherboard, a pattern for a plurality of array substrates arranged in a matrix and having display regions;

It should be noted that forming of the pattern for the opposite substrates on the first motherboard and forming of the pattern for the array substrates on the second motherboard are not carried out in a particular sequence, which will not be limited here.

(2) Forming, on the first motherboard or the second motherboard, a first sealant which has a closed profile and surrounds each of the display regions; forming, on the first motherboard, a second sealant which has a closed profile and surrounds a region where the pattern of the opposite substrates arranged in a matrix exists, or forming, on the second motherboard, a second sealant which has a closed surrounding a region where the pattern of the array substrates arranged in a matrix exists; and (3) Cell-assembling the first motherboard and the second motherboard.

For example, when forming, on the first motherboard, the pattern for a plurality of opposite substrates arranged in a matrix and having display regions in step (1), the foregoing fabrication method may further comprise: forming, on the first motherboard, a pattern of a first elastic component corresponding to an application region of the first sealant and/or an application region of the second sealant; and/or When correspondingly forming, on the second motherboard, the pattern for a plurality of array substrates arranged in a matrix and having display regions in step (1), the foregoing fabrication method may further comprise: forming, on the second motherboard, a pattern of a second elastic component corresponding to an application region of the first sealant and/or an application region of the second sealant.

In the implementation of the foregoing method provided by the embodiment of the present invention, the patterns of the elastic components may be formed in various ways. For example, the pattern of the first elastic component corresponding to the application region of the first sealant may be merely formed on the first motherboard; or the pattern of the first elastic component corresponding to the application region of the second sealant may be merely formed on the first motherboard; or the pattern of the second elastic component corresponding to the application region of the first sealant may be merely formed on the second motherboard; or the pattern of the second elastic component corresponding to the application region of the second sealant may be merely formed on the second motherboard; or the foregoing cases are optionally combined, which will not be limited here.

For example, in order to avoid an additional fabrication process, in the implementation of the foregoing method provided by the embodiment of the present invention, since a spacer is arranged on the side of the first motherboard facing the second motherboard, forming, on the first motherboard, of the pattern of the first elastic component corresponding to the application region of the first sealant and/or the application region of the second sealant may comprise: forming the pattern of the first elastic component while forming a spacer pattern in the pattern for each of the opposite substrates by using one patterning process, that is, arranging the first elastic component on a same layer as the spacer, in this way, no new mask is needed, no fabrication process is increased, and the production efficiency is not reduced.

For example, in the foregoing method provided by the embodiment of the present invention, forming of the pattern of the first elastic component while forming a spacer pattern in the pattern for each of the opposite substrates may comprise the following steps.

Firstly, forming a spacer film on the first motherboard;

Secondly, exposing the spacer film by using a half-tone or gray-tone mask, wherein a completely transparent region of the mask is corresponding to a region of the spacer pattern to be formed, and a partially transparent region of the mask is corresponding to a region of the pattern of the first elastic component to be formed; and Lastly, developing the spacer film which has been exposed to obtain the spacer pattern and the pattern of the first elastic component.

Figure 4A:
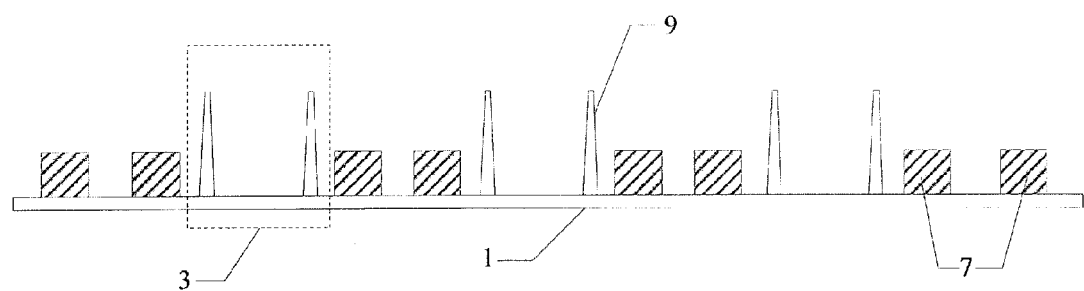
FIG. 4a and FIG. 4b are schematic diagrams illustrating a method for fabricating a cell-assembled motherboard provided by an embodiment of the present invention.
Figure 4B:
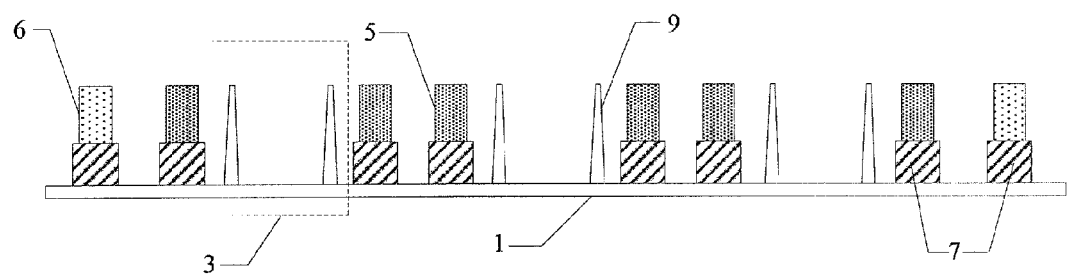

The foregoing fabrication method provided by the embodiment of the present invention is described below in detail with a specific example; and by taking the cell-assembled motherboard shown in FIG. 2a for example, the fabrication method of the cell-assembled motherboard may comprise, for example, the following steps:

S101: forming, on a first motherboard, a pattern for a plurality of opposite substrates arranged in a matrix and having display regions, and correspondingly forming, on a second motherboard, a pattern for a plurality of array substrates arranged in a matrix and having display regions;

S102: forming a pattern of a first elastic component 7 having a closed profile and surrounding each of the display regions 3 and a region where the pattern of the opposite substrates arranged in a matrix exists while forming a pattern of the spacer 9 in the pattern of each of opposite substrates on the first motherboard 1 by using one patterning process, as shown in FIG. 4a;

S103: forming a first sealant 5 closed surrounding each of the display regions 3 and a second sealant having a closed profile and surrounding the region where the pattern of the opposite substrates arranged in a matrix exists, as shown in FIG. 4b; and S104: cell-assembling the first motherboard 1 and the second motherboard 2 to obtain the cell-assembled motherboard shown in FIG. 2a.

In addition, an embodiment of the invention further provides a method for fabricating a liquid crystal display panel, which may comprise the following steps:

(1) Forming, on a first motherboard, a pattern for a plurality of opposite substrates arranged in a matrix and having display regions, and correspondingly forming, on a second motherboard, a pattern for a plurality of array substrates arranged in a matrix and having display regions;

It should be noted that forming of the pattern of the opposite substrates on the first motherboard and forming of the pattern of the array substrates on the second motherboard are not carried out in a particular sequence, which will not be limited herein.

(2) Forming, on the first motherboard or the second motherboard, a first sealant having a closed profile and surrounding each of the display regions; forming, on the first motherboard, a second sealant having a closed profile and surrounding a region where the pattern of the opposite substrates arranged in a matrix exists, or forming, on the second motherboard, a second sealant having a closed sealant and surrounding a region where the pattern of the array substrates arranged in a matrix exists;

(3) Cell-assembling the first motherboard and the second motherboard; and (4) Cutting the first motherboard and the second motherboard which are cell-assembled into a liquid crystal display panel.

For example, when forming, on the first motherboard, the pattern for a plurality of opposite substrates arranged in a matrix and having display regions in step (1), the foregoing fabrication method may further comprise: forming, on the first motherboard, a pattern of a first elastic component corresponding to an application region of the first sealant and/or an application region of the second sealant; and/or When correspondingly forming, on the second motherboard, the pattern for a plurality of array substrates arranged in a matrix and having display regions in step (1), the foregoing fabrication method may further comprise: forming, on the second motherboard, a pattern of a second elastic component corresponding to an application region of the first sealant and/or an application region of the second sealant.

In the specific implementation of the foregoing method provided by the embodiment of the present invention, the patterns of the elastic components may be formed in various ways. For example, the pattern of the first elastic component corresponding to the application region of the first sealant may be merely formed on the first motherboard; or the pattern of the first elastic component corresponding to the application region of the second sealant may be merely formed on the first motherboard; or the pattern of the second elastic component corresponding to the application region of the first sealant may be merely formed on the second motherboard; or the pattern of the second elastic component corresponding to the application region of the second sealant may be merely formed on the second motherboard; or the foregoing cases may also be optionally combined, which will not be limited herein.

For example, in order to avoid an additional fabrication process, in the foregoing method provided by the embodiment of the present invention, forming, on the first motherboard, of a pattern of the first elastic component corresponding to an application region of the first sealant and/or an application region of the second sealant, may comprise: forming the pattern of the first elastic component while forming a spacer pattern in the pattern of each of the opposite substrate by using one patterning process, that is, arranging the first elastic component on a same layer as the spacer, in this way, no new mask is needed, no fabrication process is increased, and the production efficiency is not reduced.

For example, in the foregoing method provided by the embodiment of the present invention, forming of the pattern of the first elastic component while forming a spacer pattern in the pattern of each of the opposite substrates may comprise the following steps.

Firstly, forming a spacer film on the first motherboard;

Secondly, exposing the spacer film by using a half-tone or gray-tone mask, wherein a completely transparent region of the mask is corresponding to a region of the spacer pattern to be formed, and a partially transparent region of the mask is corresponding to a region of the pattern of the first elastic component to be formed;

Lastly, developing the spacer film that has been exposed to obtain the spacer pattern and the pattern of the first elastic component.

With respect to the implementations of the foregoing method provided by the embodiment of the present invention, an embodiment of the invention further provides a liquid crystal display panel, which is fabricated by using the foregoing method provided by the embodiment of the present invention.

In the cell-assembled motherboard and the fabrication method thereof, the liquid crystal display panel and the fabrication method thereof provided by the embodiments of the invention, the first elastic component 7 is added at the position where the first motherboard 1 is in contact with the first sealant 5 and/or the position where the first motherboard 1 is in contact with the second sealant 6 and/or the second elastic component 8 is added at the position where the second motherboard 2 is in contact with the first sealant 5 and/or the position where the second motherboard 2 is in contact with the second sealant 6, so when the cell-assembled motherboard is cut, the elasticity of the added elastic components avoids the problem of non-uniform thicknesses of liquid crystal cells, which problem is caused due to the situation that a sealant poor in elasticity cannot recover from deformation, thus preventing the problem of non-uniform display brightness of the liquid crystal cells and improving the display quality; moreover, the addition of the elastic components in corresponding regions of the sealants also decreases the amount of the sealants used and consequentially reduces the production cost The foregoing embodiments merely are exemplary embodiments of the present invention, and not intended to define the scope of the invention, and the scope of invention is determined by the appended claims.

CROSS REFERENCE TO RELATED APPLICATIONS

The present application claims priority of Chinese Patent Application No. 201410035677.9 filed on Jan. 24, 2014, the disclosure of which is incorporated herein by reference in its entirety as part of the present application.

What is claimed is:

1. A cell-assembled motherboard, comprising: a first motherboard and a second motherboard which are arranged opposite to each other,
   wherein a plurality of liquid crystal cells arranged in a matrix and having display regions are arranged between the first motherboard and the second motherboard, a first sealant having a closed profile and surrounding the display region of each of the liquid crystal cells is arranged between the first motherboard and the second motherboard, and a second sealant having a closed profile and surrounding a region where the liquid crystal cells arranged in a matrix exist is arranged between the first motherboard and the second motherboard,
   wherein a first elastic component having elasticity is arranged in a position where the first motherboard is in contact with the first sealant and/or a position where the first motherboard is in contact with the second sealant; and/or
   a second elastic component having elasticity is arranged in a position where the second motherboard is in contact with the first sealant and/or a position where the second motherboard is in contact with the second sealant.

2. The motherboard according to claim 1, wherein a material of the first elastic component is same as that of a spacer located in the liquid crystal cell; and/or
   a material of the second elastic component is same as that of the spacer located in the liquid crystal cell.

3. The motherboard according to claim 2, wherein the spacer located in each liquid crystal cell is arranged on a side of the first motherboard facing the second motherboard; and the first elastic component arranged on a same layer as the spacer.

4. The motherboard according to claim 3, wherein a contact surface of the first elastic component, arranged at the position where the first motherboard is in contact with the first sealant, with the first sealant is a plane; or
   a contact surface of the first elastic component, arranged at the position where the first motherboard is in contact with the second sealant, with the second sealant is a plane; or
   a contact surface of the second elastic component, arranged at the position where the second motherboard is in contact with the first sealant, with the first sealant is a plane; or
   a contact surface of the second elastic component, arranged at the position where the second motherboard is in contact with the second sealant, with the second sealant is a plane.

5. The motherboard according to claim 2, wherein a contact surface of the first elastic component, arranged at the position where the first motherboard is in contact with the first sealant, with the first sealant is a plane; or a contact surface of the first elastic component, arranged at the position where the first motherboard is in contact with the second sealant, with the second sealant is a plane; or a contact surface of the second elastic component, arranged at the position where the second motherboard is in contact with the first sealant, with the first sealant is a plane; or a contact surface of the second elastic component, arranged at the position where the second motherboard is in contact with the second sealant, with the second sealant is a plane.

6. The motherboard according to claim 1, wherein in each liquid crystal cell, a common electrode and a pixel electrode are located on the first motherboard and the second motherboard, respectively;

at least one third sealant in a region outside the display region of the liquid crystal cell is arranged between the first motherboard and the second motherboard, and the first motherboard is electrically connected with the second motherboard through the third sealant.

7. The motherboard according to claim 6, wherein a contact surface of the first elastic component, arranged at the position where the first motherboard is in contact with the first sealant, with the first sealant is a plane; or a contact surface of the first elastic component, arranged at the position where the first motherboard is in contact with the second sealant, with the second sealant is a plane; or a contact surface of the second elastic component, arranged at the position where the second motherboard is in contact with the first sealant, with the first sealant is a plane; or a contact surface of the second elastic component, arranged at the position where the second motherboard is in contact with the second sealant, with the second sealant is a plane.

8. The motherboard according to claim 1, wherein a ratio of a first thickness of the first sealant, along a direction vertical to the first motherboard and the second motherboard, to a thickness of the liquid crystal cell, along a direction vertical to the first motherboard and the second motherboard, is from 1:1.2 to 1:2, and a ratio of a second thickness of the second sealant, along a direction vertical to the first motherboard and the second motherboard, to the thickness of the liquid crystal cell, along a direction vertical to the first motherboard and the second motherboard, is from 1:1.2 to 1:2.

9. The motherboard according to claim 8, wherein the ratio of the first thickness to the thickness of the liquid crystal cell is 1:1.5, and the ratio of the second thickness to the thickness of the liquid crystal cell is 1:1.5.

10. The motherboard according to claim 9, wherein a contact surface of the first elastic component, arranged at the position where the first motherboard is in contact with the first sealant, with the first sealant is a plane; or a contact surface of the first elastic component, arranged at the position where the first motherboard is in contact with the second sealant, with the second sealant is a plane; or a contact surface of the second elastic component, arranged at the position where the second motherboard is in contact with the first sealant, with the first sealant is a plane; or a contact surface of the second elastic component, arranged at the position where the second motherboard is in contact with the second sealant, with the second sealant is a plane.

11. The motherboard according to claim 8, wherein a contact surface of the first elastic component, arranged at the position where the first motherboard is in contact with the first sealant, with the first sealant is a plane; or a contact surface of the first elastic component, arranged at the position where the first motherboard is in contact with the second sealant, with the second sealant is a plane; or a contact surface of the second elastic component, arranged at the position where the second motherboard is in contact with the first sealant, with the first sealant is a plane; or a contact surface of the second elastic component, arranged at the position where the second motherboard is in contact with the second sealant, with the second sealant is a plane.

12. The motherboard according to claim 1, wherein a contact surface of the first elastic component, arranged at the position where the first motherboard is in contact with the first sealant, with the first sealant is a plane; or a contact surface of the first elastic component, arranged at the position where the first motherboard is in contact with the second sealant, with the second sealant is a plane; or a contact surface of the second elastic component, arranged at the position where the second motherboard is in contact with the first sealant, with the first sealant is a plane; or a contact surface of the second elastic component, arranged at the position where the second motherboard is in contact with the second sealant, with the second sealant is a plane.

13. A method for fabricating the cell-assembled motherboard according to claim 1, comprising:

forming, on a first motherboard, a pattern for a plurality of opposite substrates arranged in a matrix and having display regions, and correspondingly forming, on a second motherboard, a pattern for a plurality of array substrates arranged in a matrix and having display regions;

forming, on the first motherboard or the second motherboard, a first sealant having a closed profile and surrounding each of the display regions; forming, on the first motherboard, a second sealant having a closed profile and surrounding a region where the pattern of the opposite substrates arranged in a matrix exists, or forming, on the second motherboard, a second sealant having a closed profile and surrounding a region where the pattern of the array substrates arranged in a matrix exists; and cell-assembling the first motherboard and the second motherboard, wherein, when forming, on the first motherboard, of the pattern for a plurality of opposite substrates arranged in a matrix and having display regions, the method further comprises: forming, on the first motherboard, a pattern of a first elastic component corresponding to an application region of the first sealant and/or an application region of the second sealant; and/or when correspondingly forming, on the second motherboard, of the pattern for a plurality of array substrates arranged in a matrix and having display regions, the method further comprises: forming, on the second motherboard, a pattern of a second elastic component corresponding to an application region of the first sealant and/or an application region of the second sealant.

14. The method according to claim 13, wherein forming, on the first motherboard, of a pattern of a first elastic component corresponding to an application region of the first sealant and/or an application region of the second sealant, comprises:
forming the pattern of the first elastic component while forming a spacer pattern in the pattern of each of the opposite substrates by one patterning process.

15. The method according to claim 14, wherein forming of the pattern of the first elastic component while forming a spacer pattern in the pattern of each of the opposite substrates comprises:
forming a spacer film on the first motherboard;
exposing the spacer film by using a half-tone or gray-tone mask, wherein a completely transparent region of the mask is corresponding to a region of the spacer pattern to be formed; a partially transparent region of the mask is corresponding to a region of the pattern of the first elastic component to be formed; and
developing the spacer film that has been exposed to obtain the spacer pattern and the pattern of the first elastic component.

16. A method for fabricating a liquid crystal display panel, comprising:
forming, on a first motherboard, a pattern for a plurality of opposite substrates arranged in a matrix and having display regions, and correspondingly forming, on a second motherboard, a pattern for a plurality of array substrates arranged in a matrix and having display regions;
forming, on the first motherboard or the second motherboard, a first sealant having a closed profile and surrounding each of the display regions, forming, on the first motherboard, a second sealant having a closed profile and surrounding a region where the pattern of the opposite substrates arranged in a matrix exists, or forming, on the second motherboard, a second sealant having a closed profile and surrounding a region where the pattern of the array substrates arranged in a matrix exists;
cell-assembling the first motherboard and the second motherboard; and
cutting the first motherboard and second motherboard which are cell-assembled into a liquid crystal display panel,
wherein, when forming, on the first motherboard, of the pattern for a plurality of opposite substrates arranged in a matrix and having display regions, the method further comprises: forming, on the first motherboard, a pattern of a first elastic component corresponding to an application region of the first sealant and/or an application region of the second sealant; and/or
when correspondingly forming, on the second motherboard, of the pattern for a plurality of array substrates arranged in a matrix and having display regions, the method further comprises: forming, on the second motherboard, a pattern of a second elastic component corresponding to an application region of the first sealant and/or an application region of the second sealant.

17. The method according to claim 11, wherein forming, on the first motherboard, of a pattern of a first elastic component corresponding to an application region of the first sealant and/or an application region of the second sealant, comprises:
forming the pattern of the first elastic component while forming a spacer pattern in the pattern of each of the opposite substrates by using one patterning process.

18. The method according to claim 17, wherein forming of the pattern of the first elastic component while forming the spacer pattern in the pattern of each of the opposite substrates comprises:
forming a spacer film on the first motherboard;
exposing the spacer film by using a half-tone or gray-tone mask, wherein a completely transparent region of the mask is corresponding to a region of the spacer pattern to be formed; a partially transparent region of the mask is corresponding to a region of the pattern of the first elastic component to be formed; and
developing the spacer film exposed to obtain the spacer pattern and the pattern of the first elastic component.

19. A liquid crystal display panel, wherein the liquid crystal display panel is fabricated by using the fabrication method according to claim 16.

* * * * *